United States Patent [19]

Kurosawa et al.

[11] Patent Number: 4,636,932
[45] Date of Patent: Jan. 13, 1987

[54] DV/DT PROTECTION CIRCUIT DEVICE FOR AN AC-DC CONVERTER APPARATUS

[75] Inventors: Toshiaki Kurosawa; Seiya Shima, both of Katsuta; Takeki Ando, Naka; Hiromi Inaba, Katsuta; Hajime Nakashima, Hitachi; Toshisuke Mine, Katsuta, all of Japan

[73] Assignees: Hitachi, Ltd., Tokyo; Hitachi Engineering Co., Ltd., Ibaraki, both of Japan

[21] Appl. No.: 710,237

[22] Filed: Mar. 11, 1985

[30] Foreign Application Priority Data

Mar. 14, 1984 [JP] Japan .................................. 59-47069

[51] Int. Cl.$^4$ ............................................ H02H 7/125
[52] U.S. Cl. ........................................ 363/54; 363/88; 363/129
[58] Field of Search ................... 363/37, 44, 45, 54, 363/58, 88, 128, 129

[56] References Cited

U.S. PATENT DOCUMENTS 3,953,781  4/1976  Forster et al. ........................ 363/128
4,275,430  6/1981  Seki et al. .............................. 363/54
4,319,318  3/1982  Rippel et al. .......................... 363/58

FOREIGN PATENT DOCUMENTS 1918250  11/1970  Fed. Rep. of Germany ...... 363/129
58-83588  5/1983  Japan .

Primary Examiner—Patrick R. Salce
Assistant Examiner—Jeffrey Sterrett
Attorney, Agent, or Firm—Antonelli, Terry & Wands

[57] ABSTRACT

A dv/dt protection circuit device for an AC-DC converter apparatus including control board switching arrangement having a current cut-off function which conducts an interrupts current from a power source to a load and refluxes the load current while the current is uninterrupted by a full-wave bridge rectifier circuit having a plurality of arms. Each arm of the bridge rectifier circuit connects a reactor for suppressing a rate of change of a power source line voltage of the bridge rectifier circuit at the switching time of the switching arrangement and a condenser is provided for absorbing an overvoltage generated at an inductance on the side of the power source, the condenser being connected on the side of the power source connected to the bridge rectifier circuit.

2 Claims, 4 Drawing Figures 4,636,932

DV/DT PROTECTION CIRCUIT DEVICE FOR AN AC-DC CONVERTER APPARATUS

BACKGROUND OF THE INVENTION

This invention relates to a power converter apparatus and, more particularly, to improvements in a power converter apparatus using a controllable switching means having a current cut-off function.

Heretofore various methods for AC—DC power converter apparatus have been proposed and put into practical use. Particularly, a converter apparatus in which alternating current is converted into direct current by means of phase control using a thyristor or the like has been widely used.

Additionally, a power converter apparatus using, in place of a thyristor, a gate turn-off thyristor (hereafter called "GTO") which is combined with a transistor or the like for a switching element which compulsorily cuts off energized current has been adopted. However, overvoltage is inconveniently generated when this GTO interrupts current.

As a way of solving this problem, a method has been proposed for protecting the GTO by connecting a filter condenser to the power source side of a bridge circuit, for example, as is shown in FIG. 8 of the "POWER CONVERTER APPARATUS" disclosed in Japanese Patent Laid-Open No. 83588/1983 which was laid open in Japan on May 19, 1983.

In this method, GTO of a small dielectric strength can be used because when the GTO interrupts the energized current $I_{UGTO}$, the voltage which is generated at $ACL_U$ and $ACL_V$ is absorbed by filter condensers $C_U$, $C_V$ and $C_W$. However, this method has the following defect: In the transition from the reflux period of an electric circuit (2), which consists of a load L composed of a voltage $R_L$, a reactance $L_L$ and a direct current source $E_L$—a thyristor $V_2$—a diode $D_VO$ a GTO ($V_{GTO}$)—and a load L, to the conducting period of a current circuit (1), which consists of a power source U—a U phase reactance $ACL_U$—a GTO ($U_{GTO}$)—a load L—a thyristor $V_2$—a V phase reactance $ACL_V$—and a power source V, discharge current flows from the filter condensers $C_U$, $C_V$ and $C_W$ to a current $U_{GTO}$—$V_{GTO}$—$D_V$—$C_U$ without the medium of the power source reactor and after interrupting the reflux current of the electric circuit (2), it supplies energy to the load L.

Since, when the discharge current flows, there is nothing except the inductance of the wiring in the circuit, voltage of high voltage regulation (dv/dt) is applied to the $U_{GTO}$ and the thyristor $U_2$ (hereafter called "switching means"), and the voltage which is beyond the limit value of the voltage regulation of the $U_{GTO}$ and the $U_2$ is applied to the switching means, whereby these switching means are disadvantageously damaged.

SUMMARY OF THE INVENTION

Accordingly it is an object of the invention to provide a power converter apparatus which prevents any voltage beyond the limit value of the dv/dt of a switching means from being applied to the switching means and prevents any malfunctioning of the switching means.

This invention is characterized in that, in order to prevent the abnormal phenomena described above, a reactor is connected to each arm of a bridge circuit so that the rate of current change is suppressed.

DETAILED DESCRIPTION OF THE PREFERRED EMBODIMENT

Figure 1:
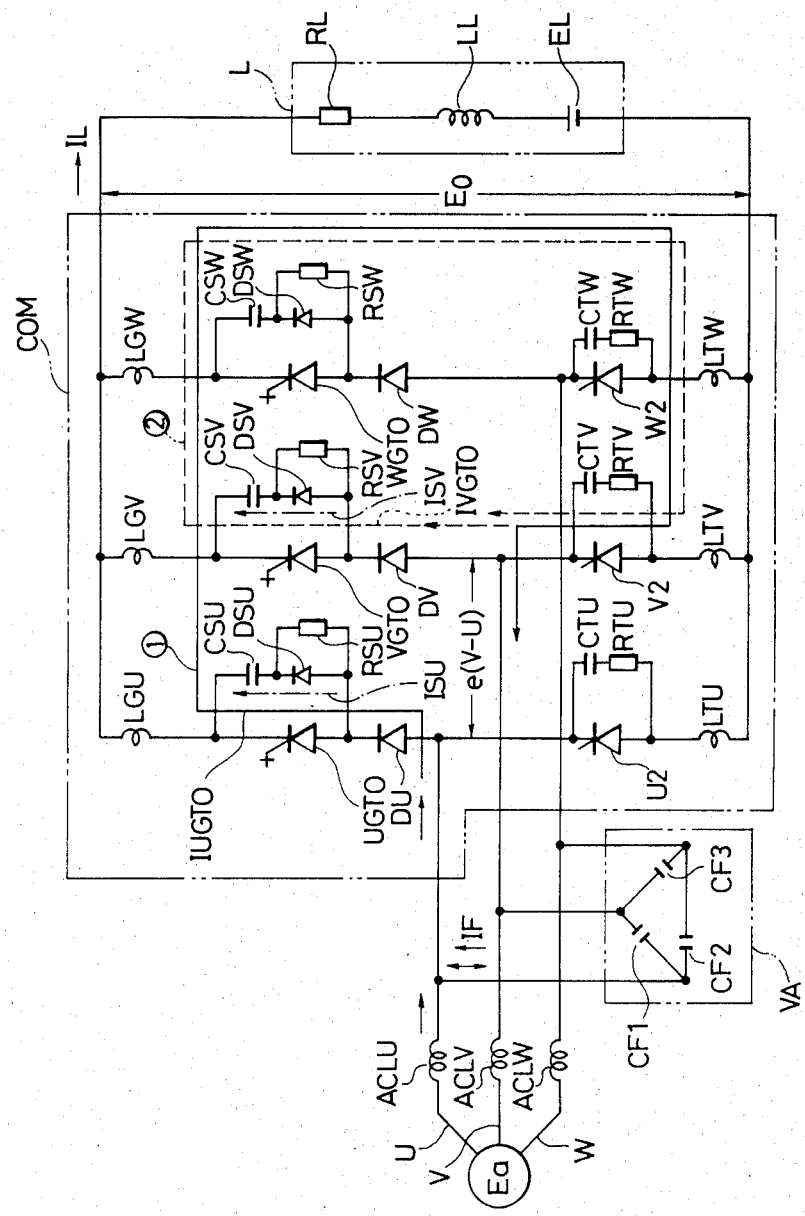
FIG. 1 shows the circuit of an embodiment of a power converter apparatus according to the invention.

Referring first to FIG. 1, three-phase voltages U, V and W of a three-phase AC power source $E_a$ are supplied to the AC terminals of a converter unit COM. The DC output voltage $E_o$ of the converter unit COM is applied to a load L. This load L includes, for example, a resistance $R_L$, an inductance $L_L$ and a DC power source $E_L$, and a unit such as a DC motor corresponds to the load L.

The converter unit COM is in the form of a full-wave bridge circuit which includes gate turn-off thyristors $U_{GTO}$, $V_{GTO}$ and $W_{GTO}$ having a current interrupting function (hereafter called the GTO element), thyristors $U_2$, $V_2$ and $W_2$, and reverse voltage blocking diodes $D_U$, $D_V$ and $D_W$. When a snubber diode $D_S$, a snubber capacitor $C_S$ and a snubber resistance $R_S$ have suffixes U, V and W, indicating relation to U-phase, V-phase and W-phase, respectively.

The symbols $ACL_U$, $ACL_V$ and $ACL_W$ are equivalent to the inductance which is included in the AC power source which includes a transformer and an electric supply wire.

An absorbing circuit VA for absorbing the overvoltage on the side of the power source at the time of chopping the current by the GTO consists only of condensers $CF_1$-$CF_3$. Each of the condensers CF is connected between the AC wires. Reactors for suppressing the rate of current change of the discharge current from the condensers $CF_1$-$CF_3$ and for suppressing fluctuation of the voltage between the anode and the cathode of the thyristors which are in the checked state are connected in series to each GTO. The overvoltages which the reactors $L_{GU}$, $L_{GV}$ and $L_{GW}$ generate are absorbed into a snubber circuit.

A regenerative region will be explained with reference to FIG. 1. The regenerative region is a region where the polarity of the output voltage $E_L$ is negative and where, when the V-phase voltage of the power source is positive in relation to the U-phase voltage, the $U_{GTO}$ conducts, and the load current $I_L$ flows in the direction shown in the Figure.

Figure 2:
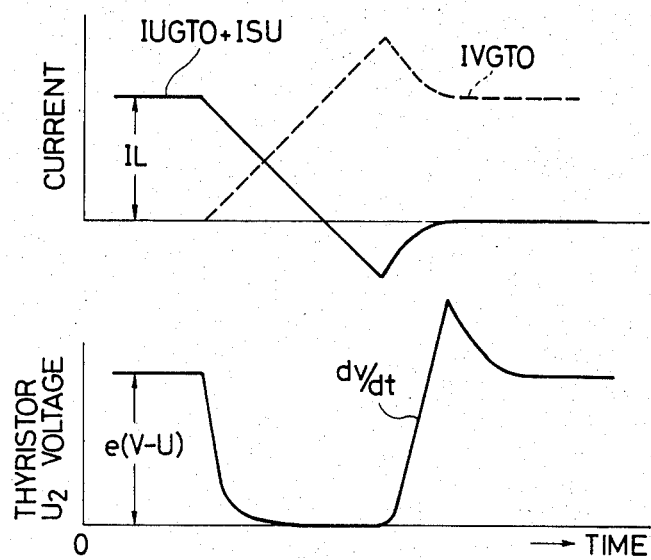
FIG. 2 is a graph showing the characteristics of current and thyristor $U_2$ voltage with respect to time at the point when a signal for arc ignition is supplied to the $V_{GTO}$ by the chopping command when current flows, as is indicated by (1) in FIG. 1, on the assumption that the reactors $L_{GU}$, $L_{GV}$ and $L_{GW}$ in the circuit shown in FIG. 1 do not exist.

Supposing that the reactors $L_{GU}$, $L_{GV}$ and $L_{GW}$ do not exist in FIG. 1, if a signal for arc ignition is fed to the $V_{GTO}$ by a chopping command when the conducting current is flowing in the electric circuit (1), as the V-phase voltage is higher than the U-phase voltage, current flows in a closed circuit to the power source in the direction of $D_V$—$V_{GTO}$—$U_{GTO}$—$D_U$. If the current which flows through the $U_{GTO}$ is $I_{UGTO}$ and the current which flows through the $C_{SU}$ is $I_{SU}$, commutation is caused such as to reduce the conducting current $I_{UGTO}+I_{SU}$. This relation is shown in FIG. 2. $I_{VGTO}$ is a current flowing through the $D_V$. Since $e_{(V-U)}$ is approximately zero during commutation, the voltage of the thyristor $U_2$ also becomes approximately zero. When commutation is completed and there is no closed circuit to the power source, $e_{(V-U)}$ becomes the original voltage and the voltage of the thyristor $U_2$ is restored with a high dv/dt. At this time, the thyristor $U_2$ has a forward voltage, in other words, positive voltage is applied to the anode. Therefore, if the rate of voltage change is high enough to exceed the limit value of the dv/dt of the thyristor, the thyristor may malfunction.

Figure 3:
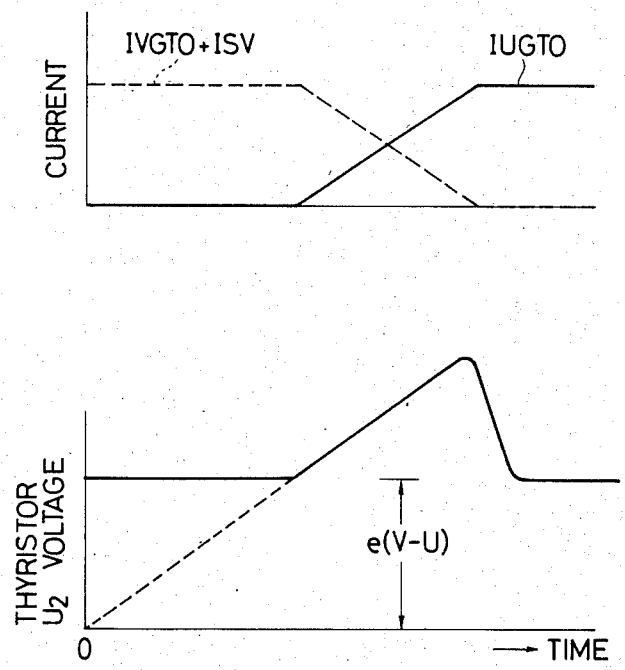
FIG. 3 is a graph showing the characteristics of current and thyristor $U_2$ voltage with respect to time at the point of commutation from the reflux current through the circuit (2) shown in FIG. 1 to the conducting current through the circuit (1) on the assumption that the reactors $L_{GU}$, $L_{GV}$ and $L_{GW}$ in the circuit shown in FIG. 1 do not exist.

Further, when the reactors $L_{GU}$, $L_{GV}$ and $L_{GW}$ do not exist, during the period of commutation from the reflux current in the electric circuit (1) to the conducting current in the electric circuit (2), the $V_{GTO}$ interrupts current at time 0, as is shown in FIG. 3, and the $I_{UGTO}$ flows into the $I_{SU}$. The voltage of the snubber condenser $C_{SV}$ is raised, as is indicated by the dotted line in FIG. 3, and when the voltage reaches $e_{(V-U)}$, the $I_{UGTO}$ begins to flow, and thereafter the reflux current is suppressed and only the conducting current $I_{GTO}$ flows. The voltage which is charged to the $C_{SV}$ during this period is added to the line voltage $e_{(V-U)}$, and is applied to the thyristor $U_2$. The voltage between the anode and the cathode of the thyristor $U_2$ has the waveform shown in FIG. 3, and the overvoltage is applied to the thyristor.

Figure 4:
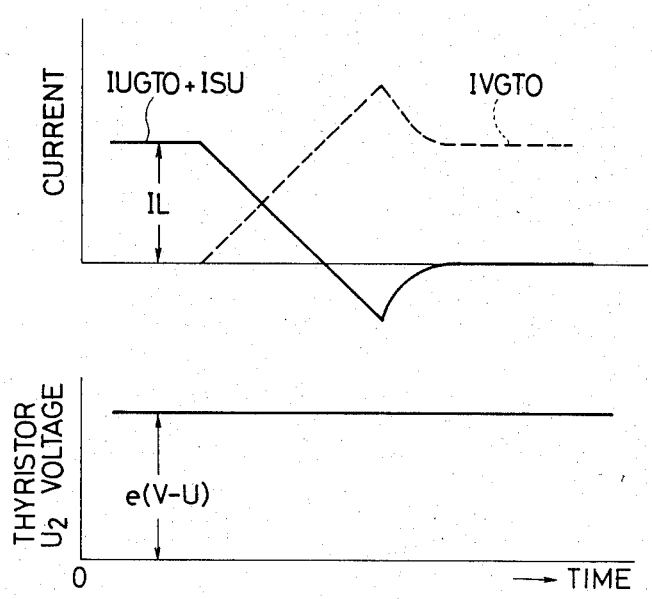
FIG. 4 is a graph showing the characteristics of current and thyristor $U_2$ voltage with respect to time in the case where an on-gate pulse is supplied to the $V_{GTO}$ when the conducting current flows through the electric circuit (1) in the circuit shown in FIG. 1.

In contrast, in the embodiment shown in FIG. 1, if an on-gate pulse is applied to the $V_{GTO}$ when the conducting current is flowing, commutation current which flows in the circuit $D_V$—$V_{GTO}$—$L_{GV}$—$L_{GU}$—$U_{GTO}$—$D_U$ is added to the supply current, because the V-phase voltage is positive in relation to the U-phase voltage. However, since the reactors $L_{GV}$ and $L_{GU}$ start to act as loads, a voltage which is the same as the supply voltage is generated in the reactors, which prevents the closed circuit to the power source and fluctuation of voltage $e_{(V-U)}$. In this way, even during commutation the voltage between the anode and the cathode of the thyristor $U_2$ is constant, as is shown in FIG. 4, which prevents a large dv/dt from being applied to the thyristor.

In transition from the charging period when the conducting current is flowing in the electric circuit (1) to the reflux period when the reflux current flows in the electric circuit (2), the voltage ($e_{(V-U)}$) of the filter condenser CF flows to the reactors $L_{GU}$ and $L_{GV}$ as a power source. The rate of current change di/dt at this time is as follows:

$$\frac{di}{dt} = \frac{e_{(V-U)}}{2 \cdot L_G} \quad (1)$$

The inductance of the reactor $L_G$ should be determined such as to satisfy the limit value of the rate of current change of the GTO elements.

The overvoltage which is produced by the change of GTO current at commutation from the reflux period, which is shown by the current (2), to the charging period, which is shown by the circuit (1), namely the change of current of the reactors $L_{GU}$ and $L_{GV}$, is absorbed by, in this case, the snubber condenser $C_{SV}$ of the $V_{GTO}$.

The overvoltage $V_{(a-k)}$ being generated between the anode and the cathode of the $V_{GTO}$ is greater when it is generated from the ACL and the CF at the power source or the $L_G$ and the $C_S$ of the arm. When the GTO chops current, the smaller the value of the $C_S$, the better, because the voltage which has been charged to the $C_S$ has to be discharged during chopping. Therefore, it is more effective to have a design such that the overvoltage $V_{(a-k)}$ meets the permissible value of the GTO for the $L_G$ and the $C_S$ of the arm. To this end, it should be set that the power source overvoltage is absorbed by the filter condenser CF so that the circuit constant satisfies the relation:

$$\frac{ACL}{1.5 \cdot CF} < \frac{L_G}{C_S}$$

The overvoltage $V_{(a-k)}$ being generated between the anode and the cathode of the $V_{GTO}$ under this condition is:

$$V_{(a-k)} = I_L \cdot \sqrt{\frac{2L_G}{C_S}} + e_{(V-U)} \quad (2)$$

An optimum constant is obtained from the formulae (1) and (2).

At this time, the overvoltage shown in formula (2) is generated in the snubber condenser $C_{SV}$ of the arm and a voltage which is the same as this overvoltage but in the opposite direction is generated in the reactor. Accordingly, the line voltage between U−V, $e_{(V-U)}$ does not change and thus the voltage between the anode and the cathode of the thyristor does not fluctuate.

The value of the inductance of the reactor $L_G$ is obtained by solving the formulae (1) and (2) as follows:

$$\frac{e_{(V-U)}}{2 \cdot \frac{di}{dt}} < L_G < \frac{C_S}{2} \left(\frac{V_{(a-k)}}{I_L}\right)^2 \quad (3)$$

and by substituting the permissible values of di/dt and $V_{(a-k)}$.

The inductance of the reactor $L_G$ in the case where the limit value of the di/dt of the GTO element is 200 A/μs and the effective value of the supply voltage is 400 V is obtained from formula (3), as follows:

$$L_G = \frac{\sqrt{2} \times 400}{2 \times 200} \approx 1.4 \, (\mu H)$$

that is, the inductance of one reactor should be about 1.4 μH or more.

This reactor inductance influences the overvoltage which is generated when the GTO is off, as is shown in formula (2). From formula (2), the inductance of the reactor $L_G$ is obtained when the dielectric strength of the GTO element is 1,600 V. Since the $C_S$ has some relation to the chopping frequency, and all the charged voltage of the $C_S$ must be discharged through the $R_S$ while the GTO is on, the capacity value is preferably small. Supposing the $C_S = 3$ μF, $I_L = 500$ A, the following equation is obtained from formula (3):

$$L_G = \frac{\{1,600 - \sqrt{2} \times 400\}^2 \times 3 \times 10^{-6}}{2 \times 500^2} \approx 6.5 \ (\mu H)$$

thus it is found that the inductance of one reactor should be about 6.5 μH or less.

The inductance of a reactor when the effective value of the supply voltage is 200 V is obtained from formulae (1) and (2). The inductance obtained is about 0.7–10.9 μH.

The reactors $LT_U$–$LT_W$ suppress the rate of current change between the thyristors at commutation.

The above explains why the $U_{GTO}$ and the $V_{GTO}$ chop current while the thyristor $V_2$ conducts. The same principle applies when each GTO chops current while thyristors $U_2$ and $W_2$ conduct.

Further, in the above explanation, a three-phase circuit is taken as an example, but this invention is also applicable to a monophase circuit. The position of the reactors may be anywhere within the arms and the negative side of the bridge circuit may comprise GTOs in place of thyristors.

Not only a gate turn-off thyristor, which is taken as an example for a switching means having a current interrupting function, but also a transistor or similar device can be used in a similar constitution.

As described above, according to the invention, the overvoltage due to power source inductance is absorbed by the condensers $CF_1$–$CF_2$; the rate of change of the discharge current is suppressed by the reactors $L_{GU}$–$L_{GW}$; these reactors retain the voltage between the arms when the circuit to the power source is closed due to commutation during a GTO chopping period; the current fluctuation between the anode and the cathode of the thyristor in the blocked state can be suppressed.

The overvoltage being generated in the reactors $L_{GU}$–$L_{GW}$ is absorbed by the snubber condensers $C_{SU}$–$C_{SW}$ such as to prevent the phenomenon wherein a large dv/dt is generated due to the fluctuation of the voltage between the anode and the cathode of the element on the negative side in the blocked state when the switching means chops current; and a small, light power converter apparatus of stable characteristics can be provided without using a switching means or large capacity element.

This invention not only presents the means to prevent malfunctioning of the thyristors $U_2$, $V_2$ and $W_2$ which is likely when a voltage which is beyond the limit value of the dv/dt of the thyristors is applied to the thyristors, but is also applicable when thyristors $U_2$, $V_2$ and $W_2$ are replaced by GTOs.

What we claim is:

1. A dv/dt protection circuit device for an AC-DC converter apparatus comprising:

controllable switching means having a current cut-off function which conducts and interrupts current from a power source to a load and refluxes the load current while the current is interrupted by a full-wave bridge rectifier circuit having a plurality of arms;

each arm of said bridge rectifier circuit connecting a reactor for suppressing a rate of change of a power source line voltage of said bridge rectifier circuit at the switching time of said switching means;

a condenser for absorbing an overvoltage generated at an inductance on the side of said power source, said condenser being connected to the side of said power source connected to said bridge rectifier circuit; and means for absorbing an overvoltage including a series circuit consisting of a condenser for absorbing an overvoltage which is generated by said reactor at said switching time of said switching means and a resistance, and a diode which is parallel to said resistance, said absorbing means being connected in parallel to said switching means;

wherein the following condition is satisfied when the inductance of one phase of said power source is ACL, the capacity of said condenser for absorbing said overvoltage is CF, an inductance of said reactor which is inserted into each arm of said bridge rectifier circuit is $L_G$, and the capacity of said condenser of said absorbing means for absorbing said overvoltage which is connected to said controllable switching means is $C_S$:

$$\frac{ACL}{1.5 \cdot CF} < \frac{L_G}{C_S}.$$

2. A dv/dt protection circuit device for an AC-DC converter apparatus comprising:

controllable switching means having a current cut-off function which conducts and interrupts current from a power source to a load and refluxes the load current while the current is interrupted by a full-wave bridge rectifier circuit having a plurality of arms;

each arm of said bridge rectifier circuit connecting a reactor for suppressing a rate of change of a power source line voltage of said bridge rectifier circuit at the switching time of said switching means;

a condenser for absorbing an overvoltage generated at an inductance on the side of said power source, said condenser being connected to the side of said power source connected to said bridge rectifier circuit; and means for absorbing an overvoltage including a series circuit consisting of a condenser for absorbing an overvoltage which is generated by said reactor at said switching time of said switching means and a resistance, and a diode which is parallel to said resistance, said absorbing means being connected in parallel to said switching means;

wherein the value of an inductance $L_G$ of said reactor inserted into each arm of said bridge rectifier circuit is set such as to satisfy the following condition when the inductance of one phase of said power source is ACL, the capacity of said condenser for absorbing said overvoltage is CF, the capacity of said condenser of said absorbing means for absorbing said overvoltage which is connected to said controllable switching means is $C_S$, the peak value of said line voltage is $e_{(V-U)}$, the limit value of said overvoltage of said controllable switching means is $V_{(a-k)}$, and the limit value of current change is di/dt:

$$\frac{e_{(V-U)}}{2 \cdot \frac{di}{dv}} < L_G < \frac{C_S}{2} \left( \frac{V_{(a-k)}}{I_L} \right)^2.$$

* * * * *